United States Patent [19]

Aichele et al.

[11] Patent Number: 4,688,381
[45] Date of Patent: Aug. 25, 1987

[54] HYDRAULIC CONTROL ARRANGEMENT

[75] Inventors: Hans Aichele, Stuttgart; Walter Beck, Schwieberdingen; Günther Schwerin, Möglingen, all of Fed. Rep. of Germany

[73] Assignee: Robert Bosch GmbH, Stuttgart, Fed. Rep. of Germany

[21] Appl. No.: 794,237

[22] Filed: Nov. 1, 1985

[30] Foreign Application Priority Data

Nov. 16, 1984 [DE] Fed. Rep. of Germany ....... 3441946

[51] Int. Cl.$^4$ ............................................. F16D 31/02
[52] U.S. Cl. ........................................ 60/452; 60/445
[58] Field of Search .......................... 60/445, 450, 452

[56] References Cited

FOREIGN PATENT DOCUMENTS 3318052 7/1984 Fed. Rep. of Germany .
3431103 8/1984 Fed. Rep. of Germany .

Primary Examiner—Stephen F. Husar
Attorney, Agent, or Firm—Michael J. Striker

[57] ABSTRACT

Hydraulic control arrangement for a driven working device particularly mounted on an agricultural vehicle, comprises a hydromotor for driving a working device, a blocking unit having a blocking valve and a pushing piston, a control valve including a control slider which controls the blocking unit and has three control edges, and a control chamber, two working chambers, and two return chambers, a throttle valve having a throttle slider and a spring arranged in a chamber and loading the throttle slider, a working conduit leading from an inlet via the throttle slider, the first control edge of the control slider and the blocking valve to the hydromotor and allowing a load pressure-independent control, a control conduit branching from the working conduit and extending via the third control edge of the control slider, the control chamber and the second return chamber to a tank, and supplied with a control pressure medium in a lowering position of the control slider via the throttle slider, and two throttle points arranged in the control conduit. Wherein the control chamber of the control valve is arranged between the second working chamber and the second return chamber, and the control conduit has a portion between the first working chamber and the control chamber in the region of the slider opening of the control valve through which the second working chamber extends.

12 Claims, 3 Drawing Figures

HYDRAULIC CONTROL ARRANGEMENT

BACKGROUND OF THE INVENTION

The present invention relates to a hydraulic control arrangement. More particularly, it relates to a hydraulic control arrangement for a working device which is driven by a hydromotor and especially arranged on agricultural vehicles.

Such proportional operating control arrangements are known in the art. One of such control arrangements is disclosed for example, in the DE-OS No. 3,318,052. In this control arrangement a control slider for controlling a single-working power lift is formed as a pressure compensating valve and a pressure reducing throttle valve, and the power lift is secured by a blocking unit. This control arrangement operates in a manner of close circuit and provides a load pressure compensating control. It has however the disadvantage that a control conduit which branches from the control slider extends through a control chamber which lies between a first working chamber associated with pressure medium stream which flows to the power lift and a discharge chamber which is associated with pressure medium stream flowing out of the power lift to the tank. The control conduit extends in the housing downstream of the control chamber via a pressure subdividing circuit of two throttle points and via a return chamber to the tank. Because of this control oil stream, the above described control arrangement for closed circuit cannot use the housing which is used in similar control arrangements for open circuits.

Another control arrangement is proposed in the German Patent Application No. P 3,431,103 which is formed for an open circuit and whose control slider cooperates with a three way throttle slider. In this control arrangement the control oil stream which branches upstream of the control slider is supplied via a spring chamber on the throttle slider and then via a control chamber of the control slider. This control chamber is located between a second working chamber and a second return chamber. Thereby it is possible in this control arrangement to provide advantageous operation in that, for example, in lowering position the control pressure for unblocking of the blocking unit can be lifted and only a control oil stream in the lowering position is required, and the energy losses in the neutral position are small because of low circulating pressure. The disadvantage of this control arrangement is that while it has its inherent advantage, it cannot be used for a type with closed circuit.

SUMMARY OF THE INVENTION

Accordingly, it is an object of the present invention to provide a hydraulic arrangement of the abovementioned general type which avoids the disadvantages of the prior art.

More particlarly, it is an object of the present invention to provide a hydraulic control arrangement of the abovementioned general type which maintains the advantages of known arrangements and makes possible in a simple construction to provide a closed circuit, in which the housing for open circuit is used.

Despite the use of the same housing for different systems, the control arrangement is designed in an especially advantageous manner for different options. The control arrangement can therefore be produced in an especially advantageous manner.

In keeping with these objects and with others which will become apparent hereinafter, one feature of the present invention resides, briefly stated, in hydraulic control arrangement in which the control chamber associated with the control slider is located between the second working chamber and the second return chamber, and the control conduit has a portion between the working chamber and the control chamber in the region of the slider opening of the control slider which extends through the second working chamber.

In accordance with another advantageous feature of the present invention, the second working chamber lies directly near the control chamber, and a prestressed return valve is located in the working conduit between the control slider and the blocking unit parallel to return stream from the hydromotor, while the piston portion which carries the first control edge has the third control edge so that both first and third control edges are associated with a housing web between both working chambers.

Still a further feature of the present invention is that the first and third control edges are formed as control openings which are provided on the periphery of the piston portion, separated from one another, and opened in opposite directions so as to form an opposite overlapping which is at most equal or smaller than the width of the associated housing web.

Another feature of the present invention is that the spring chamber of the throttle slider is connected with the second working chamber.

Finally, a still further feature of the present invention is that the first control edge is formed as a control recess, and the third control edge is formed as a longitudinal groove.

When the hydraulic control arrangement is designed in accordance with these features, an especially compact construction is provided, in that the number of the chambers of the control slider can be maintained relatively small. The small number of chambers requires the prestressed return valve in the working conduit between the control slider and the working unit, which in the lowering position prevents discharge of control oil to the tank.

In accordance with an especially advantageous feature of the present invention, the second working chamber is connected without intermediate connection directly with the control valve and parallel thereto with a discharge chamber which is located between the first working chamber and the first return chamber, a second control chamber is arranged between the second working chamber and the first control chamber and connected with the spring chamber of the throttle slider, the control slider has an auxiliary piston portion which in the lowering position interrupts communication between the second working chamber and the second control chamber and a throttle passage stands through the piston portion which carries the first control edge and through the auxiliary portion.

Another feature of the present invention is that the control slider in the region between the first working chamber and the discharge chamber is provided with an annular groove, and the throttle passage extends from the annular groove, while in the lowering and neutral positions the annular groove is separated from the working chamber and in the lowering position it is connected with the working chamber.

Still another feature of the present invention is that the throttle passage in the control slider opens in a recess between the auxiliary piston portion and the second piston portion.

The control slider is provided in the region of the first control chamber with a second piston portion which has a fourth control edge and a fifth control edge. In a neutral position of the control slider they provide unloading of the spring chamber on the throttle slider with bypassing of the pressure-increasing means in the first control conduit to the tank, in the lifting position they supply the pressure in the working conduit downstream of the first control edge to the spring chamber, and in the lowering position they branch the control oil stream via the pressure increasing means to the first control conduit.

Finally, the control slider has two damping chambers which are connected with one another by a compensating passage having a throttle, and the first control chamber is connnected with the compensating passage via a return valve which is open into the compensating passage.

These features provide for energy-economical operation of the control arrangement in which the resistance of the pre-stressed return valve in the lowering position no longer takes place. The pressure drop available for the power lift is thereby higher.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
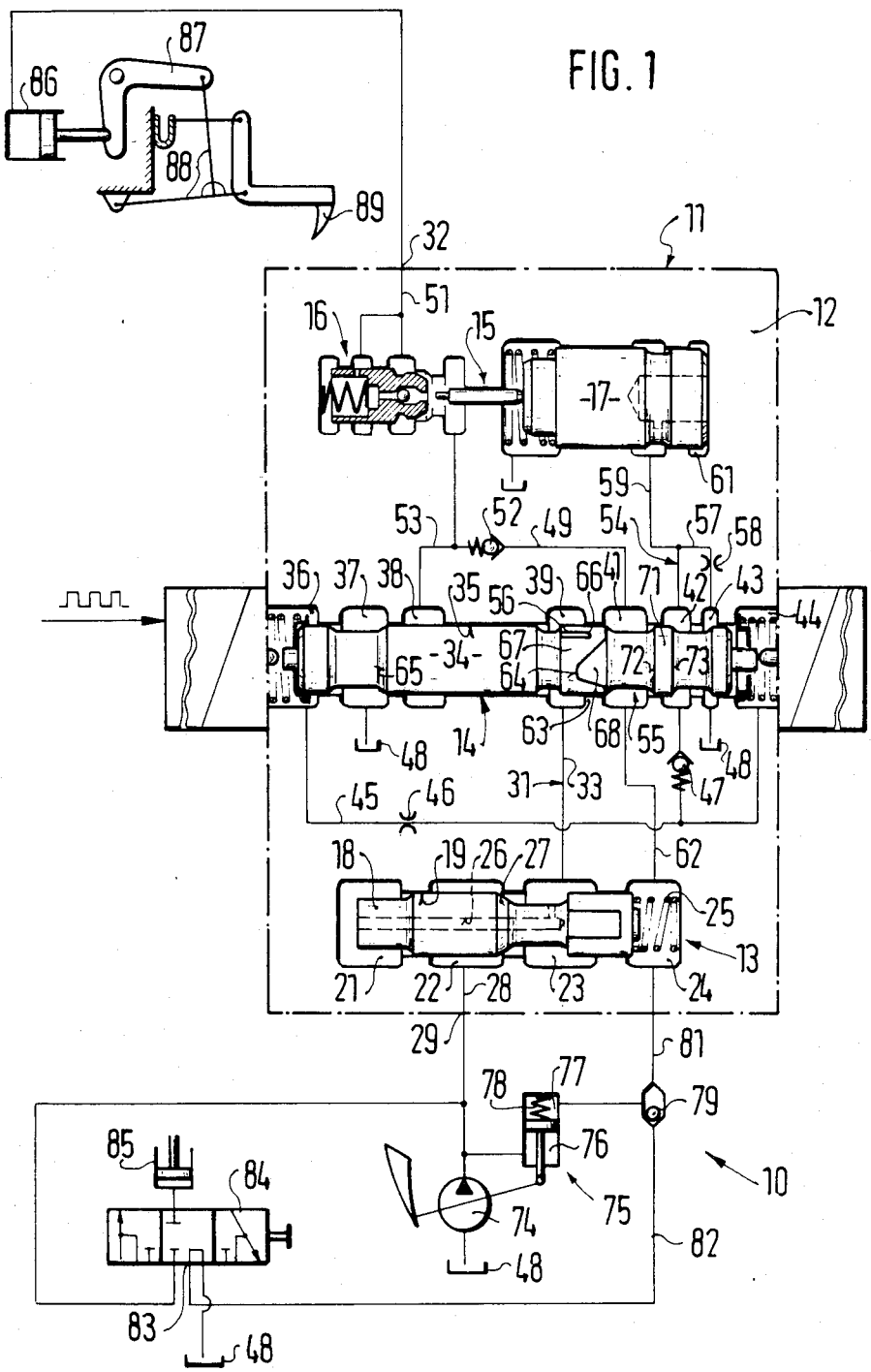
FIG. 1 is a view showing a longitudinal section of a hydraulic control arrangement in accordance with one embodiment of the invention, in a lifting position.

FIG. 1 shows a control arrangement 10 with a regulating directional valve 11 which is used for regulation of a lifting mechanism on an agricultural vehicle, particularly a tractor with an articulately connected plow.

The regulating directional valve 11 has a housing 12 which accommodates a throttle valve 13, a control valve 14, and a blocking unit 15 having parallel axes. The blocking unit 15 has a blocking valve 16 and an associated pushing piston 17.

The throttle valve 13 has a throttle slider 18 which slides in a housing 12 and particularly in its slider opening 19. A pressure chamber 21, an inlet chamber 22, an outlet chamber 23, and a spring chamber 24 are formed in the slider opening as ring-shaped widenings and arranged near one another from the left to the right in FIG. 1. The slider 18 is acted upon by a spring 25 which is arranged in the spring chamber 24, and also by pressures in the spring chamber 24 and in the pressure chamber 21. For this purpose the pressure chamber 21 communicates with an outlet chamber 23 via a control passage 26 arranged in the throttle slider 18. The spring 25 loads the throttle slider 18 in direction to an initial position in which a control edge 27 formed on the throttle slider 18 completely controls the connection of the inlet chamber 22 with the outlet chamber 23. The inlet chamber 22 is connected with an inlet 29 of the regulating directional valve 11 via a first conduit portion 28. A working conduit 31 leads to an outlet 32 via a throttle valve 13, the control valve 14 and the blocking unit 15. A second conduit portion 33 which is a part of the working conduit 31 leads from the outlet chamber 23 to the control valve 14.

The control valve 14 has a control slider 34 which is tightly and slidingly guided in a second slider opening 35. A first damping chamber 36, a first return chamber 37, a discharge chamber 38, a first working chamber 39, a second working chamber 41, a control chamber 42, a second return chamber 43 and a second damping chamber 44 are arranged in the second slider opening 35 near one another from the left to the right in FIG. 1. Both outer damping chambers 36 and 44 are connected with one another via a compensating passage 45 and a throttle 46 arranged in the passage. Further, the compensation passage 45 communicates with the control chamber 42 via a return valve 47 which is open into the compensation passage 45. Both return chambers 37 and 43 are unloaded to a tank 48. The second conduit portion 33 of the working conduit 31 opens into the first working chamber 39. A third conduit portion 49 which is a part of the working conduit 31 leads from the second working chamber 41 to the blocking valve 16. A fourth conduit portion 51 leads from the working valve 16 to the outlet 32. A return valve 52 is arranged in the third conduit portion 49 and prestressed to secure the working chamber 41.

A return conduit 53 leads from the outlets 32 via the blocking valve 16 to the discharge chamber 38 and further via the first return chamber 37 to the tank 48. This return conduit 53 is identical in the region of the blocking valve 16 with the fourth conduit portion 51 and partially with the third conduit portion 39 of the working conduit 31. The prestressed return valve 52 is located in the third conduit portion 49 upstream of its opening into the return conduit 53.

A first control conduit 54 branches from the second conduit portion 33 of the working conduit 31 upstream of the control slider 34 and leads to the tank 48. The first control conduit 54 has a first portion 55 which extends from the first working chamber 39 through the second working chamber 41 to the control chamber 42 and lies inside the slider opening 35. This first portion 55 is associated with a first throttle point 56. A second portion 57 of the first control conduit 54 leads from the control chamber 42 via a second throttle point 58 to the second return chamber 43 and thereby to the tank 48. This second portion 57 extends substantially outside of the slider openings 35. The pressure in the first control opening 54 is picked between both throttle points 56 and 58 via a branch 59 and supplied to an associated pressure chamber 61 of the pushing piston 17. Further, a second control conduit 62 connects the second working chamber 41 with the spring chamber 24 of the throttle slider 18. A housing web 63 is provided in the slider opening 35 between both working chambers 39 and 41.

A first control edge 64 is formed on the control slider 34 for controlling via the working conduit 31 of inflowing pressure medium stream proportionally to displacement of the control slider 34. Further, the control slider 34 has a second control edge 65 for controlling in respective proportional manner the pressure medium stream which flows out to the tank 48 via the return conduit 53. Moreover, a third control edge 66 is formed on the control slider 34 and influences the control oil stream in the first portion 55 of the first control conduit 54, or in other words, in the region between the first working chamber 39 and the second working chamber 41. The first control edge 64 and the third control edge 66 are formed on the same piston portion 67 of the control slider 34, the piston portion sliding in the housing web 63. The first control edge 63 is formed by one or more control recesses 68 extending on the periphery of the piston portion 67 and opening to the second working chamber 41. The third control edge 66 is formed by a longitudinal groove 69 which is open to the first working chamber 39. The control recess 68 and the longitudinal groove 69 on the piston portion 67 have a region of overlapping as seen in the longitudinal direction of the control slider 34. This region is equal or smaller than the width of the housing web 63, so that in a neutral position of the control slider 34 the connection between both working chambers 39 and 41 is blocked. The first control edge 64 is formed so that in the shown lifting position the connection between both working chambers 39 and 41 is controlled by the control edge 64, and in the lowering position this connection is interrupted. The first control conduit 54 is blocked via the third control edge 66 both in the neutral position and in the shown lifting position. In contrast, in the lowering position it opens a communication between both working chambers 39 and 41. The longitudinal groove 69 is simultaneously formed so that it forms the second throttle point 56 in the first control conduit 54.

The control slider 34 has a second piston portion 71 which lies in the region of the control chamber 42 and carries a fourth control edge 72 and a fifth control edge 73. The distance between both control edges 72 and 73 is smaller than the width of the control chamber 42, so that the second piston portion 71 is formed with negative overlapping with respect to the control chamber 42 or in other words, a communication between the second working chamber 41 and the second return chamber 43 takes place via the slider opening 35 in the neutral position. During the shown lifting position the fourth control edge 72 interrupts the communication between the second working chamber 41 and the control chamber 42, while the fifth control edge 73 maintains the communication between the control chamber 42 and the second return chamber 43. In the lowering position shown in FIG. 2, the fourth control edge 72 opens the communication between the second working chamber 41 and the control chamber 42, while the fifth control edge 73 blocks the communication from the control chamber 42 to the second return chamber 43.

The control arrangement 10 also has an adjusting pump 74 with associated adjusting device 75. The outlet of the adjusting pump 74 is connected with the inlet 29 of the regulating directional valve 11. A piston rod chamber 76 of the adjusting device 75 is loaded by outlet pressure of the adjusting pipe 74 so that it is adjusted in direction to a minimum feed quantity. A regulator spring 78 is arranged in a cylinder chamber 77 of the adjusting device 75 and urges the adjusting pump 74 in direction toward a maximum feed quantity. As long as no pressure medium is present in the system from the hydromotors, the feed stream adjustment ends near zero in correspondence with the force of the regulator spring 78. Only the leakage loss in system is compensated. The pressure produced by the adjusting pump 74 and dependent on the force of the regulator spring 78 is identified as an output pressure. Further, the cylinder chamber 77 communicates with a changeover valve 79 which acts as a maximum pressure selecting device. The changeover valve 79 is connected via a first load pressure conduit 81 with the spring chamber 24 of the throttle slider 18 and via a second load pressure conduit 82 with a load pressure connection of a second directional valve 84 which controls a second hydromotor 85. The second directional valve 84 is supplied parallel to the regulating directional valve 11 with pressure medium from the adjusting pump 74 and is formed also for a closed circulation.

The single acting hydromotor which is connected with the output 32 of the regulating directional valve 11 is a power lift 86 which act on a plow 89 pivotably connected with the tractor frame, via a lifting arm 87 and a conventional threepoint lever 88.

The operation of the control arrangement 10 is explained hereinbelow in detail, while the basic function of the regulating directional valve 11 with respect to the cooperation of the control slider 14, the throttle slider 13, and the blocking unit 15 is assumed as known. This is true both for the function of the regulating directional valve 11 alone, and for the parallel operation together with the second directional valve 84. Different control connections are performed by the control slider 34 from which the operation starts.

In a not shown neutral position of the regulating valve 11 the first control edge 64 and the third control edge 66 are arranged in the housing portion 63 so that no communication between both working chamber 39 and 41 takes place. Therefore no working stream flows via the working conduit 31 in direction to the power lift 86. Also, via the third control edge 66 no control or stream can branch from the first working chamber 39. Further, the second piston portion 71 lies in the neutral position of the control slider 34 inside the control chamber 42 so that the fourth control edge 72 and the fifth control edge 73 provide a connection from the second working chamber 41 through the slider opening 35 via the control chamber 42 to the second return chamber 43. Via this connection the spring chamber 24 on the throttle slider 18 is unloaded to the tank 48. Correspondingly, also the cylinder chamber 77 is unloaded via the changeover valve 79 so that the adjusting pump 74 produces only its lowest output pressure to compensate leakage loss in the system and the regulator spring 78 holds the equilibrium. In the neutral position of the control slider 34 the pressure chamber 61 on the pushing piston 17 is unloaded to the tank 48 so that the locking unit 15 cannot be unintentionally opened.

The control slider 34 is shown in FIG. 1 in its lifting position in which it is displaced by electromagnetic actuation from its neutral position through the displacement to the left. The first control edge 64 opens communication from the first working chamber 39 to the second working chamber 41 so that proportionally to the displacement of the control slider 34 a pressure medium stream can flow via the working conduit 31 to the power lift 86. The pressure difference which acts here via the control recess 68 is determined in a known manner by the regulator spring 78 or in parallel operation by the insignificantly stronger spring 25 on the pressure slider 18, so that a load pressure compensated control is possible also in the parallel operation, as disclosed in the abovementioned DE-OS No. 3,318,052. In the lifting position the fourth control edge 72 interrupts the first control conduit 54, so that the load pressure from the power lift 86 can be built via the second working chamber 41 and the second control conduit 62 also in the spring chamber 24. Simultaneously the fifth control edge 73 allows an unthrottled unloading of the pressure chamber 61 on the pushing piston 17 to the tank 48. In addition, the third control edge 66 is controlled in the lifting position. In other aspects the operation of the regulating directional valve 11 in the lowering position corresponds to the operation of so-called closed-center embodiment in the known constructions.

Figure 2:
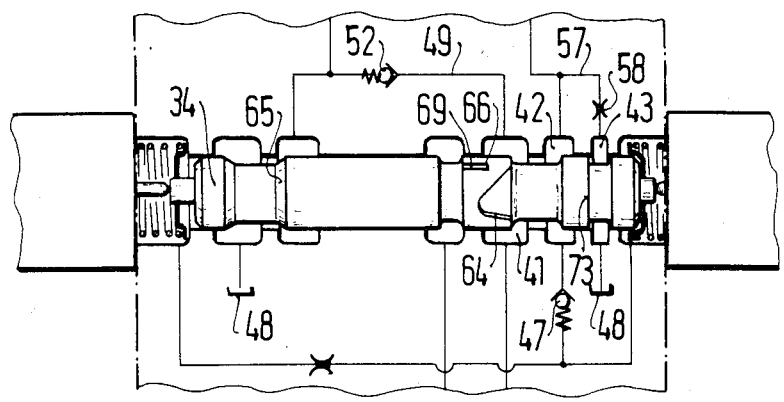
FIG. 2 is a view showing a part of the hydraulic control arrangement of FIG. 1 in the lowering position.

For a lowering position of the regulating directional valve 11, the control slider 34 is brought to the position shown in FIG. 2, for each purpose it is displaced from its neutral position to the right. The first control edge 64 is controlled in the region of the housing web 63, whereas the third control edge 66 is opened. Thereby the control oil stream can branch from the first working chamber 39 and via the longitudinal groove 69, through the second working chamber 41 into the control chamber 42 and further via the second portion 57 of the first control conduit 54 to the tank 48. The longitudinal groove 69 operates simultaneously as a first throttle point 56 in the first control conduit 54 which cooperates with the throttle slider 18 as a flow regulating valve and thereby limits the control oil stream. Because of this operation of the throttle slider 18 as a flow regulator, it is possible in advantageous manner to form the pressure-lifting means in the control conduit as pressure holding valve (see FIG. 3), whereby the unblocking pressure on the pushing piston 17 is maintained accurately during this movement.

The intermediate pressure which in FIG. 1 is throttled by the second throttle point 58 in the second portion 57 is produced via the branch 59 in the pressure chamber 61, so that by means of the pushing piston 17, the precontrolled blocking valve 16 can be opened. A pressure medium stream thereby flows from power lift 86 via the opened blocking valve 16 and the return conduit 53 to the tank 48. The magnitude of the pressure medium stream is influenced by the second control edge 65 proportionally to the displacement of the control slider 34. The prestressing on the return valve 52 in the third conduit portion 59 is selected so high that the control pressure required for the actuation of the pushing piston 17 is at least insignificantly lower, so that during the lowering process no control pressure medium escapes via the prestressed return valve 52 and the return conduit 53 to the tank. In lowering position the fixed control edge 73 blocks the communication between the control chamber 42 and the second return chamber 43 so that the control oil stream can branch via the second throttle point 58 in the first control conduit 54. The intermediate pressure formed in the control chamber 42 reaches also the outer damping chambers 36 and 44 via the return valve 47 and the compensating passage 45 and is formed there. By means of the leakage oil streams from the outer damping chamber 36 and 44 to the neighboring return chambers 37 and 43, a sufficient ventilation of these chambers is provided.

The above-described control arrangement 10, because of the special adjustment of the control oil from the first working chamber 39 in combination with its special guidance by the slider opening 35 can be used with respective design of the control slider 34 for the regulating directional valve 11 in an embodiment for closed circuit in a housing 12. The control chamber 42 is located in the region between the second working chamber 41 and the second return chamber 43 and thereby corresponds to any housing which is used in a regulating directional valve for open circuits. In addition, the advantage of the construction with open circuit can be maintained and realized with relatively simple structural means. The use of the same housing for different structural types leads further to price-favorable solutions.

Figure 3:
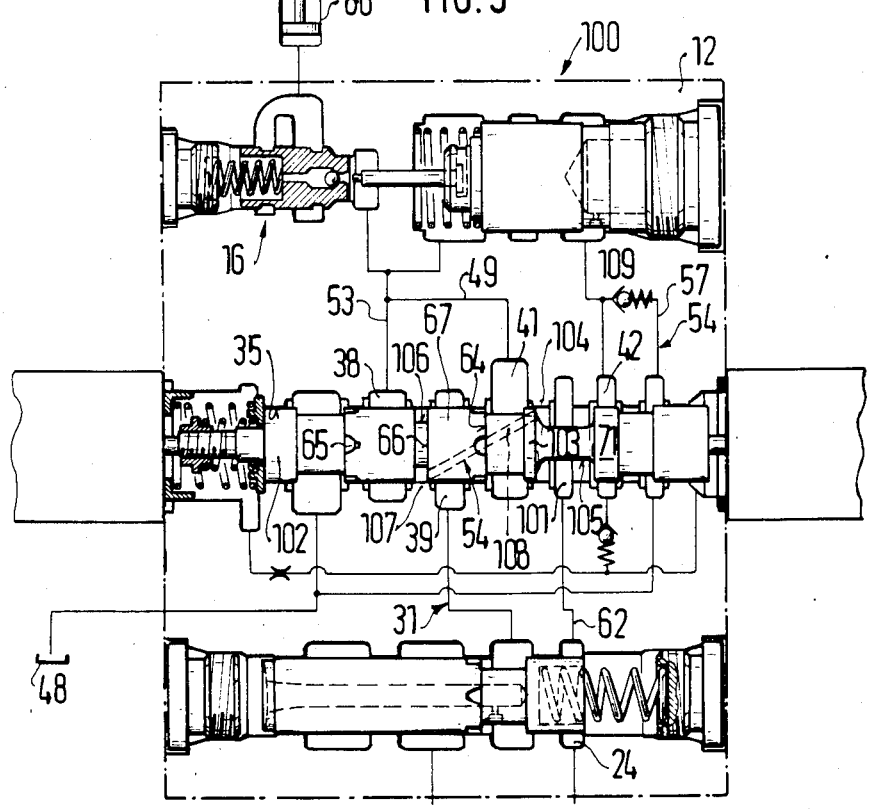
FIG. 3 is a view showing a longitudinal section of the hydraulic control arrangement in accordance with another embodiment of the invention, in a neutral position.

FIG. 3 shows a second control arrangement 10 which differs from the first control arrangement in FIG. 1 and in the same structural elements are identified with the same reference numerals.

The second control arrangement 10 does not have, first of all, the prestressed return valve 52 in the third conduit portion 49, which in the lowering position separates the control oil stream which serves for the actuation of the pushing piston from the return stream flowing out from the power lift to the tank. This separating function is now integrated in the axle of the control slider. For this purpose a second control chamber 101 is formed in its slider opening 35 and the control slider 102 has an additional auxiliary piston portion 103. While the third conduit portion 49 opens into the second working chamber 41, the second control conduit 62 is now connected with the second control chamber 101. The second control chamber 101 lies between the second working chamber 41 and the first control chamber 42. The auxiliary piston portion 103 lies in the shown neutral position as well as in the lowering position in the region of a second housing web 104 between the second working chamber 41 and the second control chamber 101 and interrupts the communication between both abovementioned chamber 41 and 101. The auxiliary piston portion 103 is separated by a recess 105 from the second piston portion 71.

The piston portion 67 which carries the first control edge 64 has the third control edge 66 associated with the other end side and formed by an annular groove 106. In the shown neutral position, the annular groove 106 lies in a third housing web 107 provided between the discharge chamber 38 and the first working chamber 39. A throttle passage 108 formed as an inclined opening extends in the interior of the control slider 102 between the annular groove 106 and the recess 105. The throttle passage 108 is associated with the first control conduit 54 and takes over the function of the first throttle point 56. The function of the second throttle point in the second portion 57 of the first control conduit is taken over by the prestressed pressure valve 109 in correspondence with the pressure required on the pushing pistons 17.

The operation of this second control arrangement 100 corresponds substantially to the operation of the first control arrangement 10 and differs from the latter only in the following aspects:

In the lifting position the pressure medium stream flows from the adjusting pump via the working conduit 31 to the power lift 86 substantially unthrottled through the third conduit portion 49, so that the pressure drop produced by the prestressed return valve 52 of FIG. 1 falls by several bars and thereby the higher pressure drop is available for the power lift 86. In the lowering position, the auxiliary piston portion 103 opens the communication between the second working chamber 41 to a second control chamber 101, so that the load pressure compensating control takes place as before.

In the shown neutral position of the control slider 102 the annular groove 106 is separated from the neighboring chamber 38 and 39. Eventually, the pressure oil which leaks into the annular groove can discharge via the throtttle passage 108 to the second control chamber 101 and thereby via the controlled first control conduit 54 to the tank 48. In the lowering position of the control slider 102 the third control edge 66 communicates the annular groove 106 with the first working chamber 39. Thereby a control oil stream can branch from the first working chamber 39 and flow via the first control conduit 54 to a tank 48. The auxiliary piston portion 103 prevents contacting of the return stream which flows from the power lift 86 via the return conduit 53 with pressure forming via the third conduit portion 49 also in the second working chamber 41, with the control oil pressure in the second control chamber 101. The control oil stream branching from the first working chamber 39 must thereby maintained in the region of the slider opening 35 far from the second working chamber 41 by means of the throttle passage 108, for arriving into the second control chamber 101.

In the second control arrangement 101 the additional chamber in the slider axle, namely the second control chamber 101, and the somewhat more expensive control slider 102, provide for the advantage that for the operation of the power lift 86 a higher pressure level is available which reduces the energy losses. Regardless of this, in the second control arrangement also the same housing can be used for the open circuit, since here also the control chambers 42 and 101 lie in the region between the second working chamber 41 and the second return chamber 43.

It is to be understood that in the shown embodiments other modifications are possible without departing from the distinctive features of the invention. For example, the control valve 14 can be provided instead of the electromagnetic control also with mechanical hydraulic control. For forming the unblocking pressure for the pushing piston 17, instead of the throttle point in the control conduit also other pressurelifting means can be provided such as for example a pressure holding valve.

It will be understood that each of the elements described above, or two or more together, may also find a useful application in other types of constructions differing from the types described above.

While the invention has been illustrated and described as embodied in a hydraulic control arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Hydraulic control arrangement for a driven working device particularly mounted on an agricultural vehicle, comprising a hydromotor arranged to drive a working device; a blocking unit having a blocking valve and a pushing piston; a tank; a control valve including a control slider which controls the blocking unit and has a first control edge for adjusting a pressure medium stream to said hydromotor during lifting, a second control edge for adjusting a pressure medium stream flowing from said hydromotor to said tank during lowering, and a third control edge, said control valve having a slider opening, a control chamber, a first and second working chamber, and a first and second return chamber; a tank; a throttle valve having a throttle slider, a spring chamber, and a spring arranged in said chamber and loading said throttle slider; an inlet; a working conduit in which said throttle slider is arranged, said working conduit leading from said inlet via said throttle slider, said first control edge of said control slider and said blocking valve to said hydromotor and allowing a load pressure-independent control; a control conduit branching upstream of said control slider from said working conduit and extending via said third control edge of said control slider, said control chamber and said second return chamber to said tank, said control conduit being supplied with a control pressure medium in a lowering position of said control slider via said throttle slider; two throttle points arranged upstream said second return chamber in said control conduit, one of said throttle points located downstream forming a pressure which serves for actuation of said pushing pistons, said first control edge monitoring communication between said first and second working chambers, said second working chamber being located between said first working chamber and said second return chamber, said spring chamber of said throttle slider in a neutral position of the control slider connecting said second return chamber with a control pressure connection with bypassing of said throttle points of said control conduit, said control chamber of said control valve being arranged between said second working chamber and said second return chamber, and said control conduit having a portion between said first working chamber and said control chamber in the region of said slider opening of said control valve through which said second working chamber extends.

2. A control arrangement as defined in claim 1, wherein said second working chamber lies immediately near said control chamber; and further comprising a prestressed return valve located in said working conduit between said control valve and said blocking unit parallel to a return stream from said hydromotor; and a housing web arranged between said working chambers, said slider of said control valve having a piston portion which carries said first control edge and is provided with said third control edge so that said first and third control edges are associated with said housing web between said working chambers.

3. A control arrangement as defined in claim 2, wherein said housing web has a predetermined width, said first and second control edges are formed as control recesses which are provided on the periphery of said piston portion and separated from one another and are also open in opposite sides so as to form an opposite overlapping which is at most equal or smaller than the width of the housing web.

4. A control arrangement as defined in claim 1, wherein said spring chamber of said throttle valve is connected with said second working chamber.

5. A control arrangement as defined in claim 1, wherein said first control edge is formed as a control recess and said third control edge is formed as a longitudinal groove.

6. A control arrangement as defined in claim 1, wherein said control valve has a second control chamber, a discharge chamber located between said first working chamber and said second return chamber, said second working chamber being connected without intermediate connection of pressure controlled medium directly to said blocking valve and parallel thereto with said discharge chamber, said second control chamber being arranged between said second working chamber and first control chamber and connected with said spring chamber of said throttle valve, said control slider having an auxiliary piston portion which interrupts communication between said second working chamber and said second control chamber in a lowering position, said control slider having a piston portion which carries said first control edge, said control valve having a throttle passage which extends through said piston portion which carries said third control edge and also through said auxiliary piston portion.

7. A control arrangement as defined in claim 6, wherein said control slider has an annular groove in the region between said first working chamber and said discharge chamber, said throttle passage extending from said annular groove, said annular groove in said lifting and neutral positions being separated from said first working chamber and in said lowering position being connected with said working chamber.

8. A control arrangement as defined in claim 6, wherein said control slider has a second piston portion and a recess between said auxiliary piston portion and said second piston portion, said throttle passage in said control slider being open in said recess between said auxiliary piston portion and said second piston portion.

9. A control arrangement as defined in claim 1, wherein said control slider is provided in the region of said control chamber with a second piston portion which has a fourth control edge and a fifth control edge which in said neutral position of said control slider control unloading of said spring chamber of said throttle valve with bypassing of said throttle points to said first control conduit, in said lifting position further provide the pressure in said working conduit downstream of said first control edge to said spring chamber, and in said lowering position branch said control oil stream via said throttle points to said first control conduit.

10. A control arrangement as defined in claim 1, wherein said control valve has two damping chambers, a compensating passage connecting said damping chambers with one another, and a throttle provided in said compensating passage; and further comprising a return valve open to said compensating passage, said first control chamber being connected via said return valve with said compensating passage.

11. A control arrangement as defined in claim 1, wherein said throttle valve is formed as a two-way valve; and further comprising an adjusting pump which supplies said two-way valve with pressure medium and has a regulator; a maximum pressure selecting device; a second consumer circuit supplied parallel from said adjusting pump and having a load pressure connection, said regulator of said adjusting pump being connected via said maximum pressure selecting device with said control pressure connection and with said load pressure connection of said second consumer circuit.

12. A control arrangement as defined in claim 1, wherein said throttle valve is formed so that in said lowering position it operates as a flow regulating valve; and further comprising a pressure holding valve arranged in said control conduit and throttling unblocking pressure.

* * * * *